United States Patent
Chen et al.

(10) Patent No.: US 9,948,431 B2
(45) Date of Patent: Apr. 17, 2018

(54) TECHNIQUES FOR MANAGING SOFT BUFFERS IN WIRELESS COMMUNICATIONS

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 14/964,249

(22) Filed: Dec. 9, 2015

(65) Prior Publication Data

US 2016/0204907 A1 Jul. 14, 2016

Related U.S. Application Data (60) Provisional application No. 62/102,480, filed on Jan. 12, 2015.

(51) Int. Cl.
*H04L 1/18* (2006.01)
*H04W 84/04* (2009.01)

(52) U.S. Cl.
CPC .......... *H04L 1/1835* (2013.01); *H04L 1/1812* (2013.01); *H04L 1/1822* (2013.01); *H04L 1/1896* (2013.01); *H04W 84/042* (2013.01)

(58) Field of Classification Search
USPC ........................................................ 370/328
See application file for complete search history.

(56) References Cited

U.S. PATENT DOCUMENTS

| | | | | |
|---|---|---|---|---|
| 7,187,708 B1* | 3/2007 | Shiu | ....................... | H04B 1/707 341/81 |
| 2009/0003290 A1* | 1/2009 | Lee | ....................... | H04L 1/0006 370/336 |
| 2011/0216663 A1* | 9/2011 | Koo | ......................... | H04J 3/14 370/252 |

(Continued)

FOREIGN PATENT DOCUMENTS

EP 2816858 A1 12/2014

OTHER PUBLICATIONS

International Search Report and Written Opinion—PCT/US2015/064937—ISA/EPO—dated Apr. 1, 2016. 13 Total Pages.

*Primary Examiner* — Gregory Sefcheck
*Assistant Examiner* — Majid Esmaeilian
(74) *Attorney, Agent, or Firm* — Arent Fox, LLP (57) ABSTRACT

Various aspects described herein relate to managing a soft buffer for decoding hybrid automatic repeat/request (HARQ) based transmissions in wireless communications. A legacy soft buffer size of a legacy soft buffer can be determined for decoding HARQ based transmissions in legacy communications, where the legacy communications are based on a first transmission time interval (TTI) of a first duration. Ultra low latency (ULL) communications can be received, where the ULL communications are based on a second TTI that is less than the first duration. A ULL soft buffer size for a ULL soft buffer for decoding HARQ based transmissions in the ULL communications can be determined. Contents of the ULL soft buffer can be managed based at least in part on the ULL soft buffer size.

26 Claims, 6 Drawing Sheets (56) References Cited

U.S. PATENT DOCUMENTS

| | | | |
|---|---|---|---|
| 2012/0087396 A1* | 4/2012 | Nimbalker | H04L 1/1822 375/219 |
| 2013/0051289 A1* | 2/2013 | Hsieh | H04L 1/1845 370/280 |
| 2014/0198758 A1 | 7/2014 | Nimbalker et al. | |
| 2015/0103752 A1* | 4/2015 | Yu | H04L 49/9005 370/329 |
| 2016/0020891 A1* | 1/2016 | Jung | H04W 72/0446 370/280 |

* cited by examiner

TECHNIQUES FOR MANAGING SOFT BUFFERS IN WIRELESS COMMUNICATIONS

CLAIM OF PRIORITY UNDER 35 U.S.C. § 119

The present application for patent claims priority to Provisional Application No. 62/102,480 entitled "TECHNIQUES FOR MANAGING SOFT BUFFERS IN WIRELESS COMMUNICATIONS" filed Jan. 12, 2015, which is assigned to the assignee hereof and hereby expressly incorporated by reference herein.

BACKGROUND

Described herein are aspects generally related to communication systems, and more particularly, to managing soft buffers for decoding transmissions in wireless technologies.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, a plurality of UEs served by a particular eNodeB may be scheduled with resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of managing a soft buffer for decoding hybrid automatic repeat/request (HARQ) based transmissions in wireless communications is provided. The method includes determining a legacy soft buffer size of a legacy soft buffer for decoding HARQ based transmissions in legacy communications. The legacy communications can be based on a first transmission time interval (TTI) of a first duration. The method also includes receiving ultra low latency (ULL) communications. The ULL communications can be based on a second transmission time interval (TTI) that is less than the first duration. The method further includes determining a ULL soft buffer size for a ULL soft buffer for decoding HARQ based transmissions in the ULL communications, and managing ULL soft buffer contents based at least in part on the ULL soft buffer size.

In other aspects, an apparatus for managing a soft buffer for decoding HARQ based transmissions in wireless communications is provided including at least one processor, and a memory communicatively coupled with the at least one processor. The at least one processor is configured to determine a legacy soft buffer size of a legacy soft buffer for decoding HARQ based transmissions in legacy communications. The legacy communications are based on a first TTI of a first duration. The at least one processor is also configured to receive ULL communications, where the ULL communications are based on a second TTI that is less than the first duration. The at least one processor is also configured to determine a ULL soft buffer size for a ULL soft buffer for decoding HARQ based transmissions in the ULL communications, and manage ULL soft buffer contents based at least in part on the ULL soft buffer size.

In another example, an apparatus for managing a soft buffer for decoding HARQ based transmissions in wireless communications is provided. The apparatus includes means for determining a legacy soft buffer size of a legacy soft buffer for decoding HARQ based transmissions in legacy communications, where the legacy communications are based on a first TTI of a first duration, and means for receiving ULL communications, where the ULL communications are based on a second TTI that is less than the first duration. The apparatus also includes means for determining a ULL soft buffer size for a ULL soft buffer for decoding HARQ based transmissions in the ULL communications, and means for managing ULL soft buffer contents based at least in part on the ULL soft buffer size.

In other aspects, a computer-readable storage medium including computer-executable code for managing a soft buffer for decoding HARQ based transmissions in wireless communications is provided. The code includes code to determine a legacy soft buffer size of a legacy soft buffer for decoding HARQ based transmissions in legacy communications, where the legacy communications are based on a first TTI of a first duration, code to receive ULL communications, where the ULL communications are based on a second TTI that is less than the first duration, code to determine a ULL soft buffer size for a ULL soft buffer for decoding HARQ based transmissions in the ULL communications, and code to manage ULL soft buffer contents based at least in part on the ULL soft buffer size.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to managing soft buffers for wireless communication technologies that are based on different length transmission time intervals (TTI). It is to be appreciated that a "soft buffer" can refer to a buffer at a device that receives hybrid automatic repeat/request (HARQ) communications and stores corresponding data packets that are not properly decoded. The stored data packets can be combined with HARQ retransmissions received by the device, whether by using maximum ratio combining to combine the same bits from the initial data packet and the retransmitted data packet, or by using incremental redundancy to attempt decoding of multiple versions of the data packet. In either case, decoding can be attempted based on the additional packets from the HARQ retransmissions. For example, an ultra low latency (ULL) wireless technology may be defined as based on a shorter transmission time interval (TTI) than an existing legacy wireless technology. In one specific example, a legacy LTE technology may utilize a transmission time interval (TTI) having a duration of a subframe defined in LTE, where an ultra low latency (ULL) LTE technology can be based on a TTI having a duration less than a subframe (e.g., one symbol, two symbols, a subframe slot, etc.). In this regard, a lower latency in communications is achieved by the shorter, more frequent TTIs. A network may support both legacy LTE and ULL LTE, and thus one or more user equipment (UE) may implement soft buffer management, as described herein, for HARQ operations on each of LTE and/or one or more ULL LTE configurations.

For example, the UE may manage the ULL soft buffer using a ULL soft buffer size determined as a function of the soft buffer size for legacy LTE communications. The legacy LTE communication soft buffer size, and thus the ULL soft buffer size, may be based on a category of the UE and/or other parameters related to UE communications. In addition, a maximum transport block size (TBS) for decoding HARQ based transmissions in ULL may be determined as a function (e.g., a fraction) of the maximum TBS for decoding HARQ based transmissions in legacy LTE communications. Moreover, for example, the legacy LTE soft buffer may be used for decoding HARQ based transmissions in a first grouping including the legacy LTE communications as well as some ULL communications (e.g., having a certain TTI), while the ULL soft buffer may be used for decoding HARQ based transmissions in a second grouping including other ULL communications (e.g., having a different TTI than the ULL communications in the first grouping).

Figure 1:
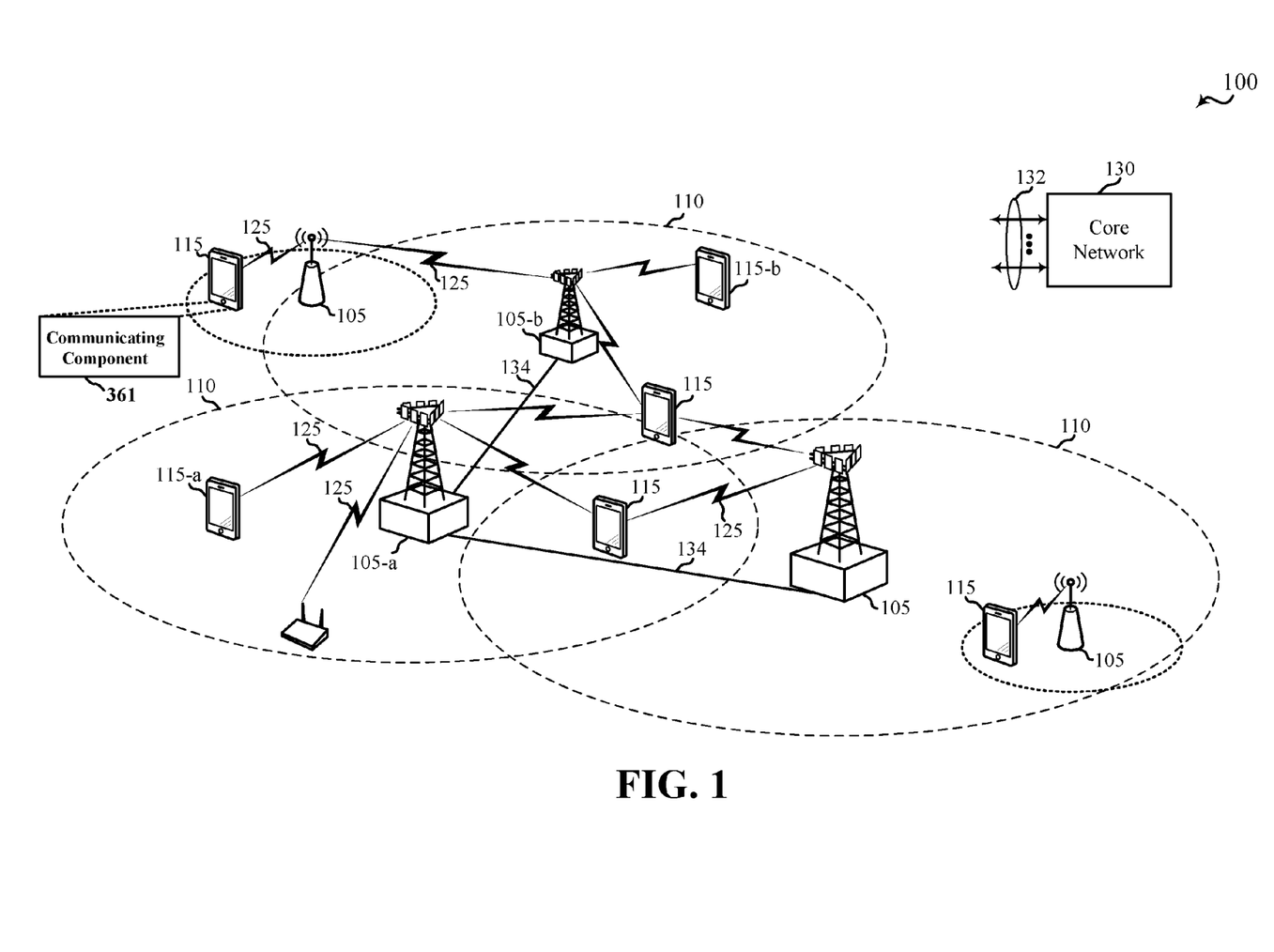
FIG. 1 shows a block diagram conceptually illustrating an example of a telecommunications system, in accordance with aspects described herein.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. As described further herein, the access points 105 may communicate with one or more UEs 115 each using a plurality of communication technologies, such as a legacy communication technology (e.g., LTE), one or more ULL communication technologies (e.g., ULL LTE), etc. Thus, one or more of UEs 115 may include a communicating component 361 configured to communicate using the legacy and/or ULL communication technologies and manage one or more soft buffers for decoding HARQ transmissions received over one or more of the communication technologies. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of communications links 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-*a* may communicate with access point 105-*a* on both a first hierarchical layer that supports first layer transmissions using a first TTI (also referred to herein as "legacy communications") and a second hierarchical layer that supports second layer transmissions using a second TTI, which may be shorter than the first TTI (also referred to herein as "ULL communications").

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Access point 105-*b* and UE 115-*b* may communicate on the second hierarchical layer through transmissions of subframes of the second subframe type. Access point 105-*b* may transmit communications related to the first or second hierarchical layer only or may transmit communications for both the first and second hierarchical layers. Where an access point 105-*b* supports both the first and second hierarchical layers, communicating component 361 can be configured to prioritize communications received from the access point 105-*b* that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communications links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-*a*, and/or second layer UE 115-*b* may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
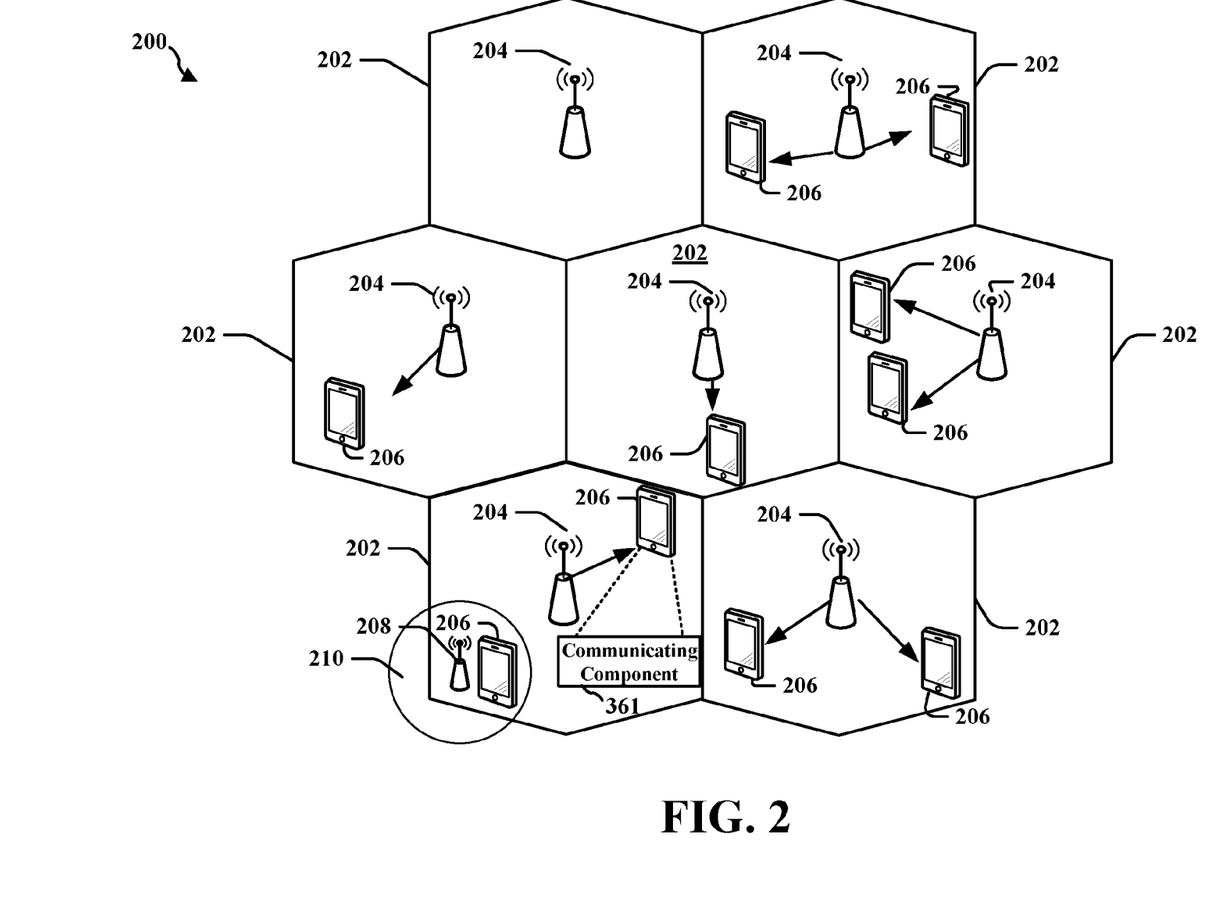
FIG. 2 is a diagram illustrating an example of an access network, in accordance with aspects described herein.

FIG. 2 is a diagram illustrating an example of an access network 200 in an LTE or ULL LTE network architecture. In this example, the access network 200 is divided into a number of cellular regions (cells) 202. One or more small cell eNBs 208 can be provided that may be of a lower power class and may have cellular regions 210 that overlap with one or more of the cells 202. The small cell eNBs 208 may be or may provide a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or small cell eNBs 208 may communicate with one or more UEs 206 each using a legacy communication technology (e.g., LTE) and one or more ULL communication technologies (e.g., ULL LTE). Thus, one or more of UEs 206 may include a communicating component 361 configured to communicate using a legacy communication technology and/or the one or more ULL communication technologies, as well as to manage one or more soft buffers for the various communication technologies. There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNBs 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
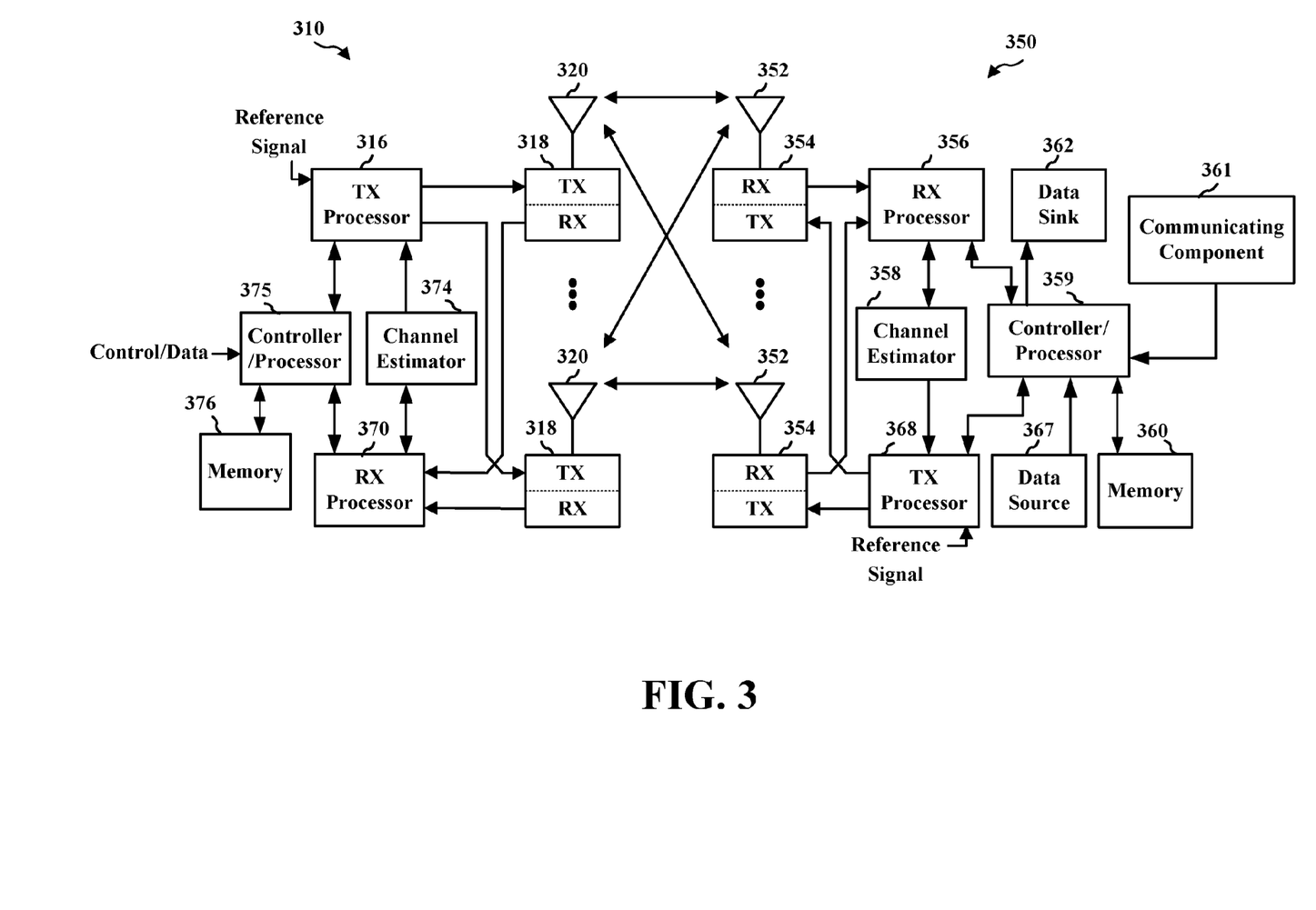
FIG. 3 is a diagram illustrating an example of an evolved Node B and user equipment in an access network, in accordance with aspects described herein.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may be configured to communicate with UEs 350 using a legacy communication technology and a ULL communication technology that is based on a smaller TTI (e.g., legacy LTE and ULL LTE), as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 configured to receive legacy and/or ULL communications from one or more eNBs, such as eNB 310, and to manage one or more soft buffers for decoding HARQ communications over the one or more communication technologies. Though communicating component 361 is shown as coupled to controller/processor 359, it is to be appreciated that communicating component 361 can also be coupled to or implemented within any processor (e.g., controller/processor 359, RX processor 356, TX processor 368, etc.) and/or any memory (e.g., memory 360), or any combination thereof, to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
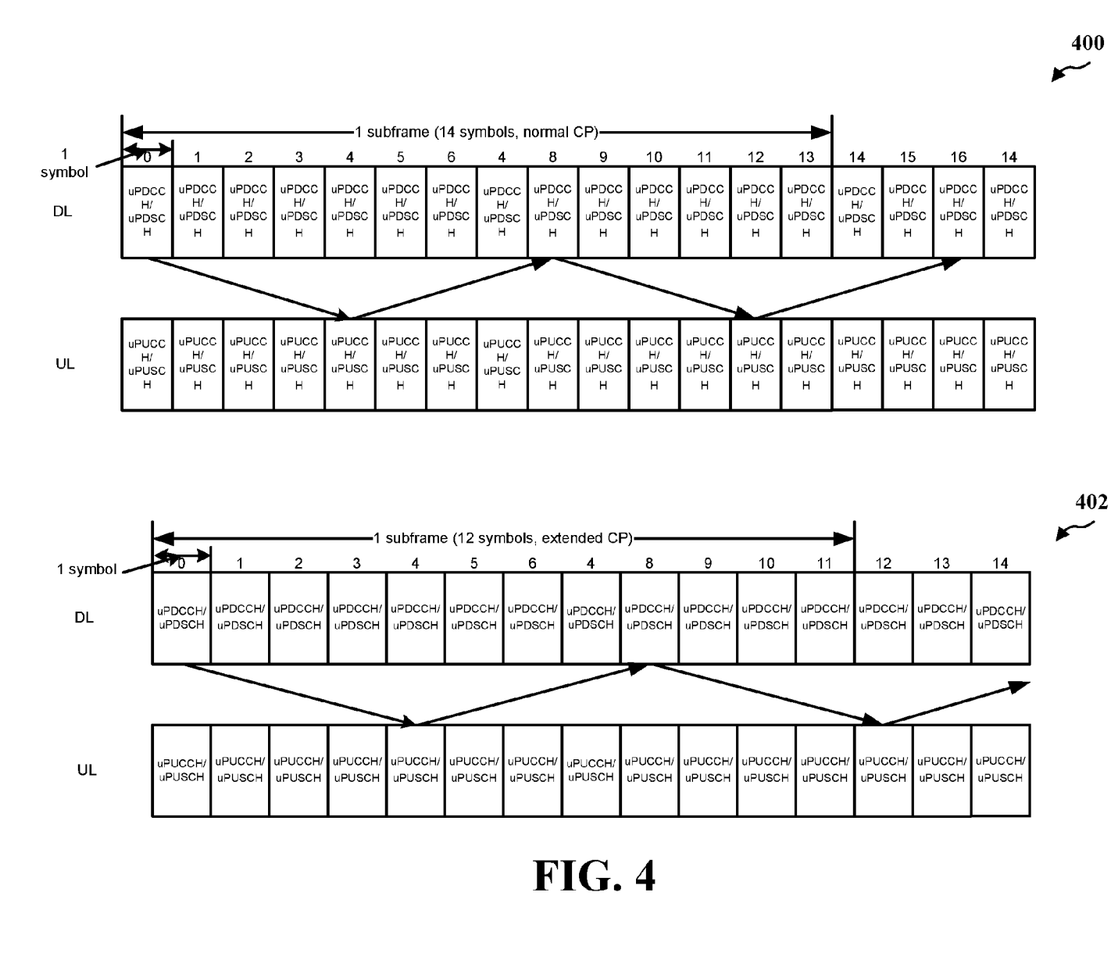
FIG. 4 is a diagram illustrating example timelines for uplink bandwidth allocation, in accordance with aspects described herein.

FIG. 4 is a diagram illustrating non-limiting examples of a ULL timelines 400, 402, with time extending from left to right in the figure, used by communicating component 361 for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. It is to be appreciated, in other examples, that a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe.

Figure 5:
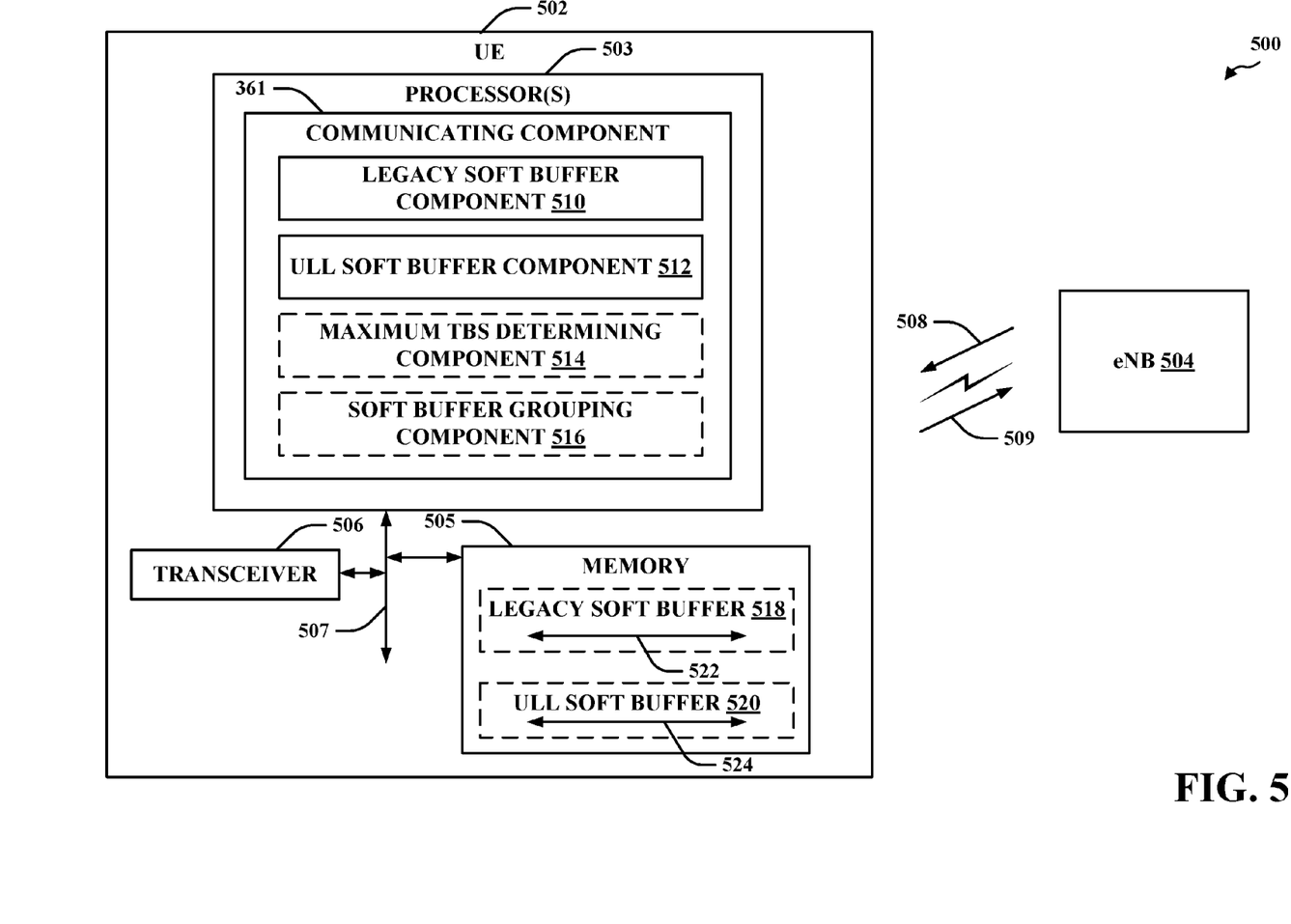
FIG. 5 is a diagram illustrating an example system for managing soft buffers for hybrid automatic repeat/request (HARQ) communications, in accordance with aspects described herein.
Figure 6:
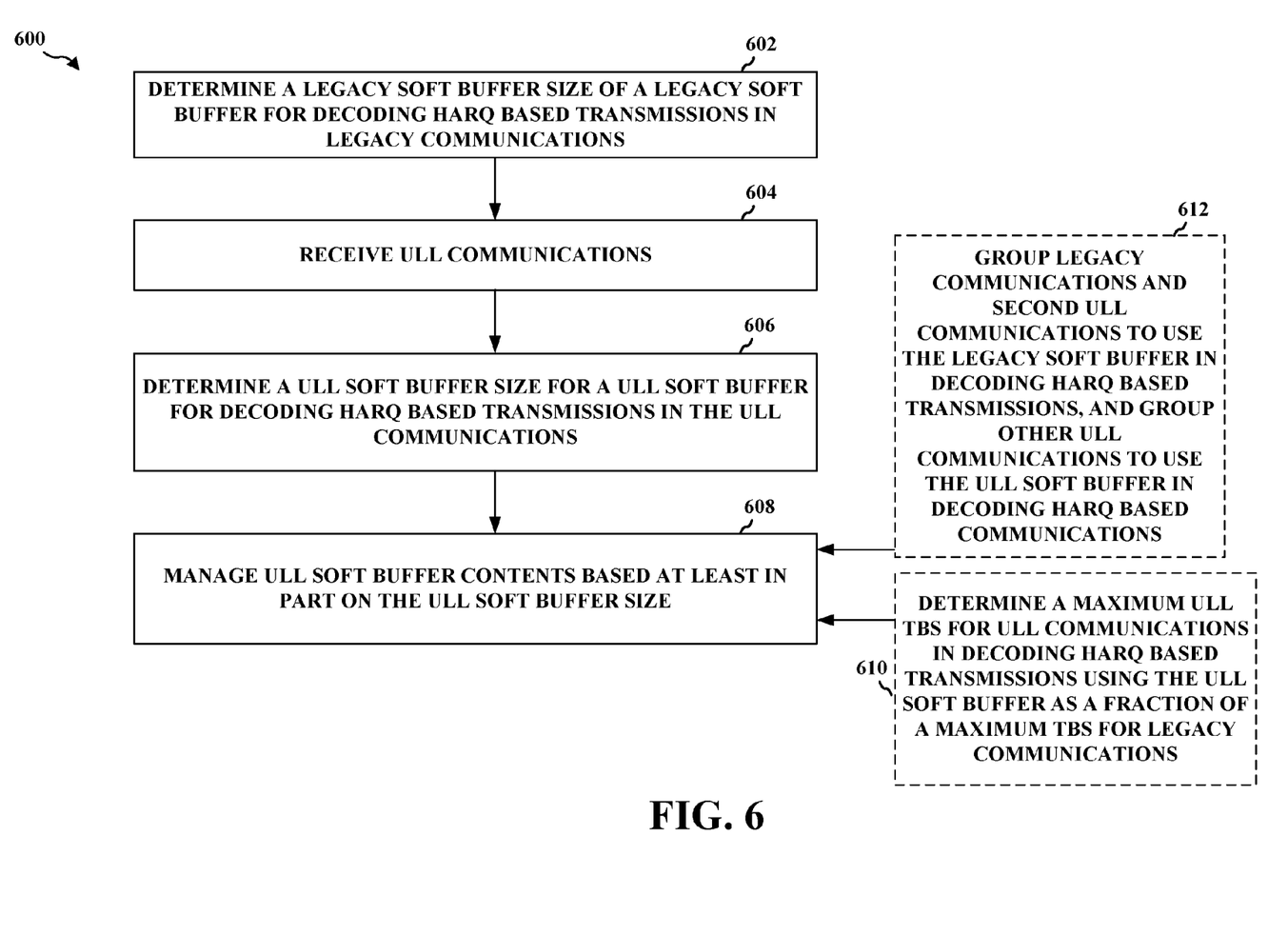
FIG. 6 is a flow chart of an example method of managing soft buffers for hybrid automatic repeat/request (HARQ) communications, in accordance with aspects described herein.

Referring to FIGS. 5-6, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIG. 6 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

It is to be appreciated that a soft buffer mechanism (e.g., a specially configured processor and/or memory) defined for decoding HARQ transmissions in legacy LTE communications can also be used for decoding HARQ transmissions in ULL LTE communications. For example, it may be possible that legacy LTE communications and ULL LTE communications are not concurrently received over a given communication link (e.g., a component carrier (CC) with a cell), which may include a case where the communication link is configured with legacy LTE as a fallback to ULL LTE (e.g. where ULL LTE is not available or achievable due to resource limitations, radio conditions, etc.). Thus, though the HARQ process response time for ULL LTE can be based on a symbol duration or other duration less than a subframe as opposed to the subframe duration of legacy LTE, the soft buffer mechanism for legacy LTE can be used when it is not needed for legacy LTE communications as the soft buffer size normally used for LTE (e.g., based on a 1ms subframe TTI) should be sufficient for the ULL communications, which can be acknowledged using a shorter TTI, and thus a shorter latency. In other configurations where legacy LTE and ULL LTE communications may be concurrently received, the soft buffer mechanism currently used to decode HARQ transmissions in legacy LTE may be modified to additionally accommodate ULL communications, as described further herein.

FIG. 5 illustrates an example system 500 for managing soft buffers for legacy and/or ULL communications. It is to be appreciated that a "soft buffer" can refer to a buffer at a device as defined above, as well as by the following description. System 500 includes a UE 502 that communicates with an eNB 504 to access a wireless network, examples of which are described in FIGS. 1-3 (e.g., access points 105, eNB 204, 208, eNB 310, UEs 115, 206, 350, etc.), above. In an aspect, eNB 504 and UE 502 may have established one or more downlink channels over which to communicate via downlink signals 509, which can be transmitted by eNB 504 (e.g., via a transceiver thereof, which is not shown) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals 508, which can be transmitted by UE 502 (e.g., via transceiver 506) and received by eNB 504 (e.g., via a transceiver thereof) for communicating control and/or data messages (e.g., in signaling) from the UE 502 to the eNB 504 over configured communication resources. As described further herein, for example, eNB 504 may communicate a resource grant that can indicate resources over which the UE 502 is to communicate (e.g., transmit or receive) data with eNB 504 over a legacy timeline (e.g., based on a 1 ms subframe TTI), one or more ULL timelines (e.g., a timeline having a TTI that is less than a subframe in duration, such as the timelines 400, 402 in FIG. 4), etc.

In an aspect, UE 502 may include one or more processors 503 and/or a memory 505 that may be communicatively coupled, e.g., via one or more buses 507, and may operate in conjunction with or otherwise implement a communicating component 361 for receiving resource grants from eNB 504 for legacy and/or ULL communications and communicating over the resources, as well as managing soft buffers for legacy and/or ULL communications. For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505, which may have a defined capacity and store the data defining the soft buffer and instructions for managing the soft buffer, may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a legacy soft buffer component 510 for managing a legacy soft buffer 518 for legacy communications, such as legacy LTE communications that are based on a 1ms subframe TTI. In an aspect, for example, legacy soft buffer component 510 may include hardware (e.g., one or more processor modules of the one or more processors 503) and/or computer-readable code or instructions stored in memory 505 and executable by at least one of the one or more processors 503 to perform the specially configured legacy soft buffer operations described herein. Further, for instance, the one or more processors 503 and/or memory 505 may execute actions or operations defined by a ULL soft buffer component 512 for managing a ULL soft buffer 520 for ULL communications having a smaller TTI duration than the legacy communications, such as ULL LTE communications that are based on a subframe that can be based on a TTI that is less than a subframe in duration (e.g., 1 symbol, 2, symbols, 1 slot, etc.). In an aspect, for example, ULL soft buffer component 512 may include hardware (e.g., one or more processor modules of the one or more processors 503) and/or computer-readable code or instructions stored in memory 505 and executable by at least one of the one or more processors 503 to perform the specially configured ULL soft buffer operations described herein.

Further, for instance, the one or more processors 503 and/or memory 505 may optionally execute actions or operations defined by a maximum TBS determining component 514 for determining a maximum TBS related to ULL communications as a fraction of a maximum TBS for legacy communications. In an aspect, for example, maximum TBS determining component 514 may include hardware (e.g., one or more processor modules of the one or more processors 503) and/or computer-readable code or instructions stored in memory 505 and executable by at least one of the one or more processors 503 to perform the specially configured maximum TBS determining operations described herein. Further, for instance, the one or more processors 503 and/or memory 505 may optionally execute actions or operations defined by a soft buffer grouping component 516 for grouping one or more soft buffers for decoding HARQ transmissions for legacy and/or multiple ULL communications. In an aspect, for example, soft buffer grouping component 516 may include hardware (e.g., one or more processor modules of the one or more processors 503) and/or computer-readable code or instructions stored in memory 505 and executable by at least one of the one or more processors 503 to perform the specially configured soft buffer grouping operations described herein.

It is to be appreciated that transceiver 506 may be configured to transmit and receive wireless signals through one or more antennas, an RF front end, one or more transmitters, and one or more receivers. In an aspect, transceiver 506 may be tuned to operate at specified frequencies such that UE 502 can communicate (e.g., with one or more eNBs 504) at a certain frequency. In an aspect, the one or more processors 503 may configure transceiver 506 to operate at a specified frequency and power level based on a configuration, a communication protocol, etc. to transmit uplink signals 508 and/or receive downlink signals 509 over related uplink or downlink communication channels.

In an aspect, transceiver 506 can operate in multiple bands (e.g., using a multiband-multimode modem, not shown) such to process digital data sent and received using transceiver 506. In an aspect, transceiver 506 can be multiband and be configured to support multiple frequency bands for a specific communications protocol. In an aspect, transceiver 506 can be configured to support multiple operating networks and communications protocols. Thus, for example, transceiver 506 may enable transmission and/or reception of signals based on a specified modem configuration.

FIG. 6 illustrates an example method 600 for managing (e.g., by a UE 502) a soft buffer for ULL communications. At Block 602, the UE 502 may determine a legacy soft buffer size of a legacy soft buffer for decoding HARQ based transmissions in legacy communications. In an aspect, legacy soft buffer component 510, e.g., in conjunction with processor(s) 503 and/or memory 505, can determine the legacy soft buffer size 522 of the legacy soft buffer 518, which may be configured in memory 505, for decoding HARQ based transmissions in legacy communications with eNB 504. For example, legacy soft buffer component 510 can configured or otherwise determine the legacy soft buffer size 522 of the legacy soft buffer 518 based on one or more parameters, such as but not limited to one or more of a category of UE 502 related to downlink and/or uplink capabilities of the UE 502, a downlink transmission mode, a number of HARQ processes operating at the UE 502, a number of CCs utilized by the UE in CA or multiple connectivity, etc. For instance, legacy soft buffer component 510 can determine a smaller legacy soft buffer size 522 for categories of UE related to machine-to-machine communications as the peak rate for communications to such UEs may be smaller than for other UEs. Moreover, for example, legacy soft buffer component 510 can determine a legacy soft buffer size 522 proportional to a number of HARQ processes or CCs (e.g., more buffer size for more HARQ processes or CCs).

In addition, legacy soft buffer component 510 can be configured with the legacy soft buffer size 522 by eNB 504 or other network components, a configuration stored on UE 502, and/or the like. In one example, legacy soft buffer component 510 can accordingly determine the legacy soft buffer size 522 based at least in part on the configuration and/or the other parameters described above. Moreover, legacy soft buffer component 510 can accordingly manage the legacy soft buffer 518 based on the legacy soft buffer size 522 to store packets that are not properly decoded for subsequent decoding attempts based on HARQ retransmissions of the packets from eNB 504. It is to be appreciated that this managing of the legacy soft buffer 518 can include determining when to remove packets from the legacy soft buffer 518 when the legacy soft buffer 518 achieves a capacity corresponding to the legacy soft buffer size 522, such as by removing older packets first.

At Block 604, the UE 502 may receive ULL communications. In an aspect, communicating component 361, e.g., in conjunction with processor(s) 503, memory 505, and/or transceiver 506, can receive the ULL communications (e.g., from a cell of eNB 504). As described, communicating component 361 may concurrently receive legacy and ULL communications from eNB 504 (or at least can receive ULL communications from the cell while a legacy connection is also established with the cell and/or vice versa). Thus, communicating component 361 may monitor legacy and ULL resources on a given CC or communication link. It is to be appreciated that the UE 502 may be configured with legacy communications as a fallback to ULL communications, as described (and thus soft buffer management may be simplified since LTE traffic may be reduced in the presence of ULL traffic). In any case, based on receiving ULL communications, UE 502 can separately manage soft buffers 518 and 520 (e.g. in memory 505) for legacy and ULL communications, respectively. In one example, UE 502 can determine ULL soft buffer 520 parameters (e.g., ULL soft buffer size 524) for managing the ULL soft buffer 520, where the ULL soft buffer parameters are determined based on the legacy soft buffer 518 (e.g., and/or on one or more similar parameters thereof).

Thus, at Block 606, the UE 502 may determine a ULL soft buffer size for a ULL soft buffer for decoding HARQ based transmissions in the ULL communications. In an aspect, ULL soft buffer component 512, e.g., in conjunction with processor(s) 503 and/or memory 505, can determine the ULL soft buffer size 524 for the ULL soft buffer 520 for decoding HARQ based transmissions in the ULL communications. For example, ULL soft buffer component 512 may determine the ULL soft buffer size 524 as a function of the legacy soft buffer size 522. In this regard, a total soft buffer size (e.g., legacy soft buffer size 522 plus ULL soft buffer size 524) may increase for a given UE 502 or category of UE 502. In one example, ULL soft buffer component 512 can determine ULL soft buffer sizes 524 for ULL soft buffers 520 corresponding to various ULL communications (e.g., for ULL communications having a TTI of 1 symbol, 2 symbols, 1 slot, etc.). For example, ULL soft buffer component 512 can determine the ULL soft buffer size 524 proportional to the difference in TTI between the ULL communications and the legacy communications (e.g., $\frac{1}{14}$ of a normal cyclic prefix (CP) legacy LTE soft buffer size 522 for ULL LTE communications based on 1 symbol TTI, $\frac{1}{7}$ of a normal CP legacy LTE soft buffer size 522 for ULL LTE communications based on 2 symbol TTI, $\frac{1}{2}$ of a normal CP legacy LTE soft buffer size for ULL LTE communications based on 1 slot TTI, etc.). In one example, ULL soft buffer component 512 can determine the ULL soft buffer size 524 as a certain proportion of the legacy soft buffer size 522 to support multiple types of ULL communications up to the proportion (e.g., $\frac{1}{2}$ of a legacy LTE soft buffer size 522 for ULL LTE communications based on a TTI having a duration of up to 1 slot).

At Block 608, the UE 502 can manage ULL soft buffer contents based at least in part on the ULL soft buffer size. In an aspect, ULL soft buffer component 512, e.g., in conjunction with processor(s) 503 and/or memory 505, can manage ULL soft buffer 520 contents based at least in part on the ULL soft buffer size 524. As described with respect to the legacy soft buffer 518, managing the ULL soft buffer 520 can include deleting ULL soft buffer contents when a capacity of the ULL soft buffer 520 achieves the ULL soft buffer size 524 (e.g., deleting the oldest ULL packets first). It is to be appreciated that ULL soft buffer component 512 can manage the ULL soft buffer 520 using a similar process as legacy soft buffer component 510 may use to manage the legacy soft buffer 518. In an example, ULL soft buffer component 512 may determine the ULL soft buffer size 524 and manage the ULL soft buffer 520 for certain UE categories, DL transmission modes, numbers of HARQ processes, etc. In addition, in an example, ULL soft buffer component 512 may group multiple types of ULL communications to use the ULL soft buffer 520 based on the soft buffer size (e.g., 1 symbol, 2 symbol, and 1 slot ULL communications to use the same ULL soft buffer 520 with a ULL soft buffer size computed based on up to 1 slot ULL communications). Moreover, in an example, ULL soft buffer component 512 can remove packets from the ULL soft buffer 520 where a HARQ retransmission of a ULL packet is received from the eNB 504 that allows for properly decoding the ULL packet, as described.

At Block 610, the UE 502 may optionally determine a maximum TBS for ULL communications in decoding HARQ based transmissions using the ULL soft buffer as a fraction of a maximum TBS for legacy communications. In an aspect, maximum TBS determining component 514, e.g., in conjunction with processor(s) 503, memory 505, and/or transceiver 506, can determine the maximum TBS for ULL communications in decoding HARQ based transmissions using the ULL soft buffer 520 as the fraction of the maximum TBS for legacy communications. For example, maximum TBS determining component 514 can determine the maximum TBS for legacy communications for a given TTI (e.g., a subframe TTI in legacy LTE), where the maximum TBS can be specified per symbol (e.g., SC-FDM/OFDM symbol). Maximum TBS determining component 514 can then determine the maximum TBS based on a proportion of the TTI of legacy communications to the TTI of the ULL communications. For example, maximum TBS determining component 514 can determine the maximum TBS for ULL LTE communications as 1/14 of the maximum TBS for normal CP legacy LTE communications where the ULL LTE communications are of a 1 symbol TTI, 1/7 of the maximum TBS for normal CP legacy LTE communications where the ULL LTE communications are of a 2 symbol TTI, etc.

For example, the maximum TBS from a UE perspective can be defined on a per symbol basis, on a per subframe basis, or based on a different time unit. Defining maximum TBS on a per symbol basis can ensure that the UE 502 is not required to process beyond a peak rate defined per symbol. As a result, for instance, when a subframe has 14 symbols, the UE 502 may not be required to process beyond 14 times of the per symbol peak rate. Defining the maximum TBS on a per subframe basis can ensure that the UE 502 is not required process beyond a peak rate defined per subframe. However, this may have the possibility that, on a per symbol basis, the peak rate per symbol may be larger 1/14th of the peak rate per subframe when the subframe has 14 symbols. For example, maximum TBS determining component 514 can determine the maximum TBS in the form of a maximum TBS received per codeword (or transport block), a maximum TBS received over two codewords (or two transport blocks), or a combination of, etc. It is to be appreciated that other variations ways of defining TBS are also possible and may be utilized in this regard.

In another example, at Block 612, the UE 502 may optionally group legacy communications and second ULL communications to use the legacy soft buffer 518 in decoding HARQ based transmissions, and group other ULL communications to use the ULL soft buffer 520 in decoding HARQ based communications. In an aspect, soft buffer grouping component 516, e.g. in conjunction with processor (s) 503 and/or memory 505, may group the legacy communications and second ULL communications to use the legacy soft buffer 518 in decoding HARQ based transmissions, and group other ULL communications to use the ULL soft buffer 520 in decoding HARQ based communications. In the above example for legacy LTE, 1 symbol ULL LTE, 2 symbol ULL LTE, and 1 slot ULL LTE, soft buffer grouping component 516 may group legacy LTE and 1 slot ULL LTE communications to use the legacy soft buffer component 510 to decode HARQ transmissions over legacy LTE and 1 slot ULL LTE, and can group 1 symbol and 2 symbol ULL LTE communications to use the ULL soft buffer component 512 to decode HARQ transmissions over 1 symbol and 2 symbol ULL LTE. In this example, ULL soft buffer component 512 can determine the ULL soft buffer size 524 based on 2 symbol ULL LTE communications. For example, this may result in smaller total soft buffer size than when using a separate soft buffer for each type of communication. In this specific example, the total soft buffer size is increased by the size of the ULL soft buffer for 2 symbol ULL LTE communications (e.g., 1/7 of the normal CP legacy LTE soft buffer size). In addition, in this example, soft buffer grouping component 516 may partition the legacy soft buffer 518 and/or the ULL soft buffer 520 between the various communications based on a fixed number of HARQ processes (e.g., 8 processes). It is to be appreciated that the legacy soft buffer component 510 and/or the ULL soft buffer component 512 may need not limit the soft buffer sizes 522, 524 for the smaller ULL TTI in the group because the soft buffer sizes 522, 524 can be designed to cover half of total encoded bits after 1/3 encoding.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing soft buffers for decoding hybrid automatic repeat/request (HARQ) based transmissions in wireless communications, comprising:
   determining a legacy soft buffer size of a legacy soft buffer for decoding HARQ based transmissions in legacy communications, the legacy communications being based on a first transmission time interval (TTI) of a first duration;
   receiving ultra low latency (ULL) communications, the ULL communications being based on a second TTI that is less than the first duration;
   determining, based at least in part on the second TTI, a ULL soft buffer size for a ULL soft buffer for decoding HARQ based transmissions in the ULL communications, wherein determining the ULL soft buffer size is a function of the legacy soft buffer size, wherein the function corresponds to a proportion of the first duration to a second duration of the second TTI;

managing, for a component carrier, ULL soft buffer contents based at least in part on the ULL soft buffer size; and managing, for the component carrier and separately from management of the ULL soft buffer contents, legacy soft buffer contents based on the legacy soft buffer size.

2. The method of claim 1, wherein the legacy soft buffer size for decoding HARQ based transmissions in the legacy communications is based on at least one of a user equipment (UE) category, a downlink transmission mode, a number of HARQ processes, or a number of component carriers in carrier aggregation.

3. The method of claim 1, wherein a ULL maximum transport block size for ULL communications in decoding HARQ based transmissions based on the ULL soft buffer as a fraction of a maximum transport block size for the legacy communications.

4. The method of claim 1, further comprising determining a second ULL soft buffer size for decoding HARQ based transmissions of second ULL communications as a second function of the legacy soft buffer size, wherein the second ULL communications are based on a third TTI that is less than the first duration.

5. The method of claim 1, further comprising grouping legacy communications and a second ULL communications to use the legacy soft buffer of the legacy soft buffer size for decoding HARQ based transmissions in the legacy communications and the second ULL communications.

6. The method of claim 5, wherein the second ULL communications are based on a third TTI of a slot duration.

7. The method of claim 1, further comprising grouping the ULL communications with a second ULL communications based on a third TTI less than the first duration to use the ULL soft buffer in decoding HARQ based transmissions in the ULL communications and the second ULL communications.

8. The method of claim 7, wherein the second TTI is of a symbol duration, and the third TTI is of a two symbol duration.

9. The method of claim 1, further comprising partitioning the legacy soft buffer or the ULL soft buffer based at least in part on a number of HARQ processes.

10. An apparatus for managing soft buffers for decoding hybrid automatic repeat/request (HARQ) based transmissions in wireless communications, comprising:
at least one processor; and
a memory communicatively coupled with the at least one processor;
wherein the at least one processor is configured to:
determine a legacy soft buffer size of a legacy soft buffer for decoding HARQ based transmissions in legacy communications, the legacy communications being based on a first transmission time interval (TTI) of a first duration;
receive ultra low latency (ULL) communications, the ULL communications being based on a second TTI that is less than the first duration;
determine, based at least in part on the second TTI, a ULL soft buffer size for a ULL soft buffer for decoding HARQ based transmissions in the ULL communications, wherein the at least one processor is configured to determine the ULL soft buffer size as a function of the legacy soft buffer size, wherein the function corresponds to a proportion of the first duration to a second duration of the second TTI;

manage, for a component carrier, ULL soft buffer contents based at least in part on the ULL soft buffer size; and manage, for the component carrier and separately from management of the ULL soft buffer contents, legacy soft buffer contents based on the legacy soft buffer size.

11. The apparatus of claim 10, wherein the at least one processor is configured to determine the legacy soft buffer size for decoding HARQ based transmissions in the legacy communications based at least in part on at least one of a user equipment (UE) category, a downlink transmission mode, a number of HARQ processes, or a number of component carriers in carrier aggregation.

12. The apparatus of claim 10, wherein the at least one processor is configured to determine a ULL maximum transport block size for ULL communications in decoding HARQ based transmissions based on the ULL soft buffer as a fraction of a maximum transport block size for the legacy communications.

13. The apparatus of claim 10, wherein the at least one processor is configured to determine a second ULL soft buffer size for decoding HARQ based transmissions of second ULL communications as a second function of the legacy soft buffer size, wherein the second ULL communications are based on a third TTI that is less than the first duration.

14. The apparatus of claim 10, wherein the at least one processor is configured to group the legacy communications and a second ULL communications to use the legacy soft buffer of the legacy soft buffer size for decoding HARQ based transmissions in the legacy communications and the second ULL communications.

15. The apparatus of claim 14, wherein the second ULL communications are based on a third TTI of a slot duration.

16. The apparatus of claim 10, wherein the at least one processor is configured to group the ULL communications with a second ULL communications based on a third TTI less than the first duration to use the ULL soft buffer in decoding HARQ based transmissions in the ULL communications and the second ULL communications.

17. The apparatus of claim 16, wherein the second TTI is of a symbol duration, and the third TTI is of a two symbol duration.

18. The apparatus of claim 10, wherein the at least one processor is configured to partition the legacy soft buffer or the ULL soft buffer based at least in part on a number of HARQ processes.

19. An apparatus for managing soft buffers for decoding hybrid automatic repeat/request (HARQ) based transmissions in wireless communications, comprising:
means for determining a legacy soft buffer size of a legacy soft buffer for decoding HARQ based transmissions in legacy communications, the legacy communications being based on a first transmission time interval (TTI) of a first duration;
means for receiving ultra low latency (ULL) communications, the ULL communications being based on a second TTI that is less than the first duration;
means for determining, based at least in part on the second TTI, a ULL soft buffer size for a ULL soft buffer for decoding HARQ based transmissions in the ULL communications, wherein the means for determining the ULL soft buffer size determines the ULL soft buffer size as a function of the legacy soft buffer size, wherein the function corresponds to a proportion of the first duration to a second duration of the second TTI;

means for managing, for a component carrier, ULL soft buffer contents based at least in part on the ULL soft buffer size; and means for managing, for the component carrier and separately from management of the ULL soft buffer contents, legacy soft buffer contents based on the legacy soft buffer size.

20. The apparatus of claim 19, wherein the means for determining determines the legacy soft buffer size for decoding HARQ based transmissions in the legacy communications based at least in part on at least one of a user equipment (UE) category, a downlink transmission mode, a number of HARQ processes, or a number of component carriers in carrier aggregation.

21. The apparatus of claim 19, further comprising means for determining a ULL maximum transport block size for ULL communications in decoding HARQ based transmissions based on the ULL soft buffer as a fraction of a maximum transport block size for the legacy communications.

22. The apparatus of claim 19 further comprising means for determining a second ULL soft buffer size for decoding HARQ based transmissions of second ULL communications as a second function of the legacy soft buffer size, wherein the second ULL communications are based on a third TTI that is less than the first duration.

23. A non-transitory computer-readable storage medium comprising computer-executable code for managing soft buffers for decoding hybrid automatic repeat/request (HARQ) based transmissions in wireless communications, comprising code to:

determine a legacy soft buffer size of a legacy soft buffer for decoding HARQ based transmissions in legacy communications, the legacy communications being based on a first transmission time interval (TTI) of a first duration;

receive ultra low latency (ULL) communications, the ULL communications being based on a second TTI that is less than the first duration;

determine, based at least in part on the second TTI, a ULL soft buffer size for a ULL soft buffer for decoding HARQ based transmissions in the ULL communications, wherein the code to determine the ULL soft buffer size determines the ULL soft buffer size as a function of the legacy soft buffer size, wherein the function corresponds to a proportion of the first duration to a second duration of the second TTI;

manage, for a component carrier, ULL soft buffer contents based at least in part on the ULL soft buffer size; and manage, for the component carrier and separately from management of the ULL soft buffer contents, legacy soft buffer contents based on the legacy soft buffer size.

24. The non-transitory computer-readable storage medium of claim 23, wherein the code to determine determines the legacy soft buffer size for decoding HARQ based transmissions in the legacy communications is based at least in part on at least one of a user equipment (UE) category, a downlink transmission mode, a number of HARQ processes, or a number of component carriers in carrier aggregation.

25. The non-transitory computer-readable storage medium of claim 23, further comprising code to determine a ULL maximum transport block size for ULL communications in decoding HARQ based transmissions based on the ULL soft buffer as a fraction of a maximum transport block size for the legacy communications.

26. The apparatus of claim 23 further comprising code to determine a second ULL soft buffer size for decoding HARQ based transmissions of second ULL communications as a second function of the legacy soft buffer size, wherein the second ULL communications are based on a third TTI that is less than the first duration.

* * * * *